UNITED STATES PATENT OFFICE.

HENRI RAYMOND VIDAL, OF PARIS, FRANCE.

CRESOL-SULFUR DYE AND PROCESS OF MAKING SAME.

SPECIFICATION forming part of Letters Patent No. 629,221, dated July 18, 1899.

Application filed March 29, 1899. Serial No. 710,939. (No specimens.)

*To all whom it may concern:*

Be it known that I, HENRI RAYMOND VIDAL, engineer, a resident of Paris, in the Republic of France, have invented new and useful Improvements in the Manufacture of Coloring-Matters, which are fully set forth in the following specification.

In the specification of my previous patent, No. 523,138, dated July 17, 1894, I described the formation of direct cotton-coloring agents obtained by the treatment with toluquinone or hydrotoluquinone of ammonia in the presence of sulfur alone or of sulfur and alkaline sulfids. I subsequently found that these identical coloring agents which originated (before) in the conversion of toluquinone into amido-cresols, 1 2 5 and 1 3 6, by reason of the transformation of a hydroxyl group, being in the ortho or meta position in relation to the methyl group, may be obtained more readily by starting with benzene azo-cresols obtained from ortho or meta cresol. Thus I heat thirty kilograms of benzene-azo-ortho-cresol, 40 kilograms of soda, and 8 kilograms of sulfur in a pan or digester in an oil-bath, stirring the mixture as it is heated, and generally raising the temperature to 180° centigrade, and, after distillation with anilin, to 240° centigrade. The heating is continued for from six to eight hours.

For the benzene-azo-ortho-cresol I may substitute benzene-azo-meta-cresol in the formula of the reaction which has been given, or a mixture of benzene-azo-ortho-cresol and benzene-azo-meta-cresol, resulting from the action of di-azo-benzene upon commercial cresol—which may or may not be freed from para-cresol—may be employed.

The products obtained show the following characteristics:

First. The derivative from the benzene-azo-ortho-cresol takes the shape of a black brittle substance, which becomes blue-black on being dissolved in water, and under the action of acids yields up a liberal amount of a black precipitate soluble in alkaline sulfids, and taking when dissolved therein a blackish-brown color, while, when it is dissolved in alkaline meta-bi-sulfites in an acid medium, it turns a dirty yellow. It dyes direct a deep black, in the first-mentioned medium, vegetable fiber; in the second, animal fiber, without necessitating any oxidation. These dyes resist air, light, and the various chemicals.

Second. The derivative from benzene-azo-meta-cresol is in the form of a deep-black brittle substance soluble in water, when it turns a blackish yellow and precipitating under the action of acids. The precipitated product is soluble in alkaline sulfids and in solutions of meta-bi-sulfite of soda and potash. It dyes direct, in the former case, vegetable fiber; in the latter, animal fiber.

These two black dyes differ from each other in the following characteristics: the benzene-azo-ortho-cresol black is soluble in water, when it becomes blue-black and will dye vegetable fiber some very rich black shades, while the benzene-azo-meta-creosol black, when dissolved in water, turns a dirty yellow and dyes vegetable fiber very rich blue shades.

As compared with the hydroquinone black described in the specification of prior Patent No. 523,138, dated July 17, 1894, my new black dyes are distinguishable by the fact that when dissolved they assume blue-black and blackish-yellow shades, and in the dyeing-bath from the very outset impart to cotton a solid black color. They consequently necessitate no oxidation and no fixing and unite in the dye in a perfect manner, whereas the black dyes obtained from hydroquinone, and by the analogous improvements and processes described in Patents of January 15, 1895, Nos. 532,484 and 532,503, will dissolve into bottle-green and impart a green color to vegetable fiber. They only dye black when subsequently subjected to oxidation. Moreover, these blacks do not unite in the dye so well.

It will be understood that while "soda" is alone specified in the claims equivalent reagents, such as alkaline sulfids, are included.

I claim—

1. The process of preparing coloring-matters by subjecting benzene-azo-cresol, obtained from meta or ortho cresol, to the action of sulfur in the presence of soda.

2. The described coloring-matters derived from benzene-azo-cresols, being black brittle substances soluble in water and precipitating from such solution under the action of acids, soluble in alkaline sulfids, dyeing animal and vegetable fiber direct without oxidation, and imparting to cotton in the dyeing-bath a black color from the outset, as set forth.

In testimony whereof I have signed this specification in the presence of two subscribing witnesses.

HENRI RAYMOND VIDAL.

Witnesses:
EMILE LEDRES,
EDWARD P. MACLEAN.